US007413357B2

(12) United States Patent
Badalian

(10) Patent No.: US 7,413,357 B2
(45) Date of Patent: Aug. 19, 2008

(54) CONCEALED CAMERA

(75) Inventor: Edward Badalian, Costa Mesa, CA (US)

(73) Assignee: Silverstate Safety Image, La Mirada, CA (US)

( * ) Notice: Subject to any disclaimer, the term of this patent is extended or adjusted under 35 U.S.C. 154(b) by 318 days.

(21) Appl. No.: 11/151,876

(22) Filed: Jun. 13, 2005

(65) Prior Publication Data

US 2006/0279631 A1 Dec. 14, 2006

(51) Int. Cl.
*G03B 17/00* (2006.01)

(52) U.S. Cl. ........................ 396/427; 396/433; 348/143

(58) Field of Classification Search ................. 396/427, 396/535, 433; 348/143

See application file for complete search history.

(56) References Cited

U.S. PATENT DOCUMENTS

| | | | | |
|---|---|---|---|---|
| 2,187,449 | A * | 1/1940 | French | 396/341 |
| 4,982,281 | A * | 1/1991 | Gutierrez | 348/151 |
| 5,289,321 | A | 2/1994 | Secor | |
| 6,151,065 | A | 11/2000 | Steed et al. | |
| 6,249,310 | B1 * | 6/2001 | Lefkowitz | 348/151 |
| 6,442,240 | B1 * | 8/2002 | Otto | 379/37 |
| 2006/0103727 | A1 * | 5/2006 | Tseng | 348/148 |

* cited by examiner

*Primary Examiner*—Christopher Mahoney
(74) *Attorney, Agent, or Firm*—The Soni Law Firm

(57) ABSTRACT

A concealed camera comprising a housing, a subminiature camera and a peep hole of very small size through which the camera may perceive a large field of vision. With a high resolution camera and the tiny peep hole, the camera may be positioned or located in plain view as concealed within a myriad of functional objects, such as a clock, reflector, light or any other common looking device in the area of desired view or surveillance. Multiple concealed cameras may by employed and perhaps synchronized in a surveillance system such that the downstream viewed image may be automatically switched from one image to another as desired by the system user.

15 Claims, 2 Drawing Sheets

FIG. 3
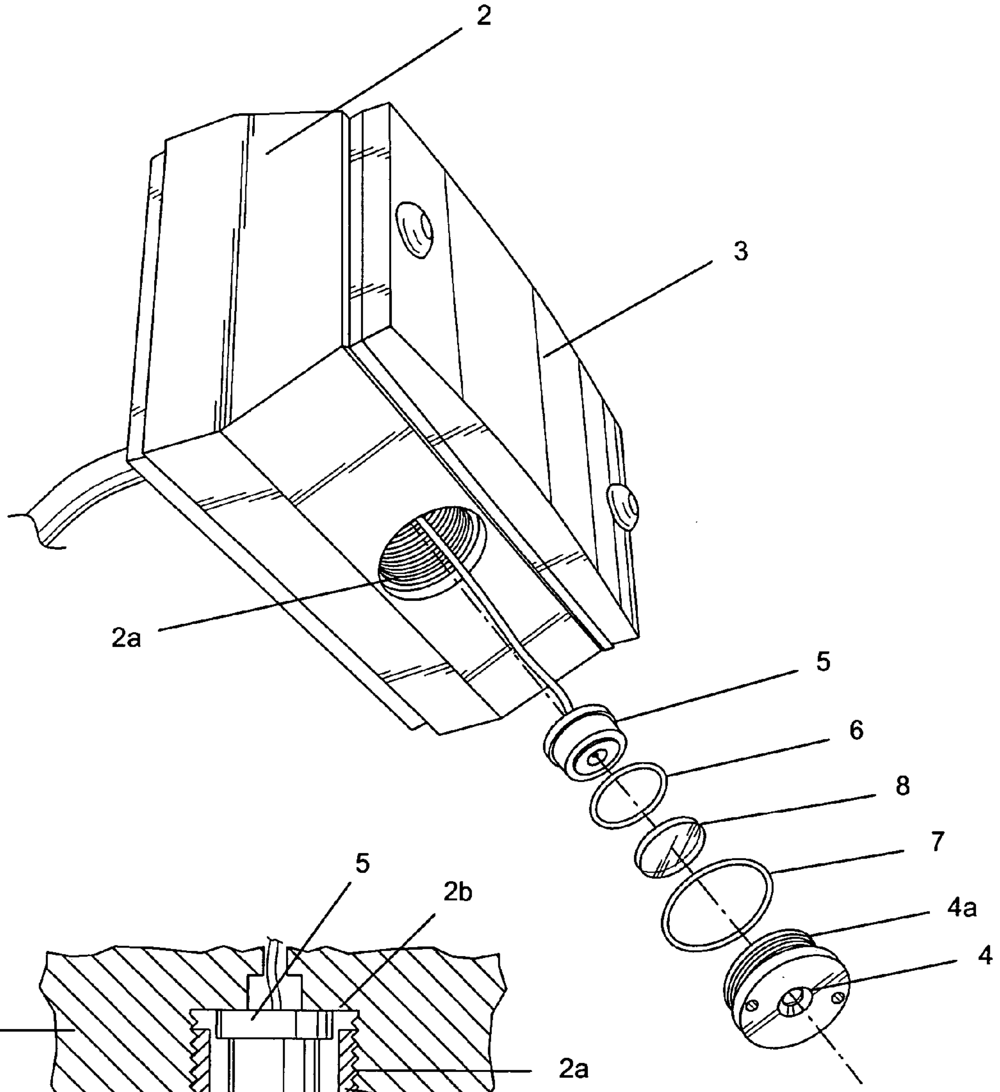
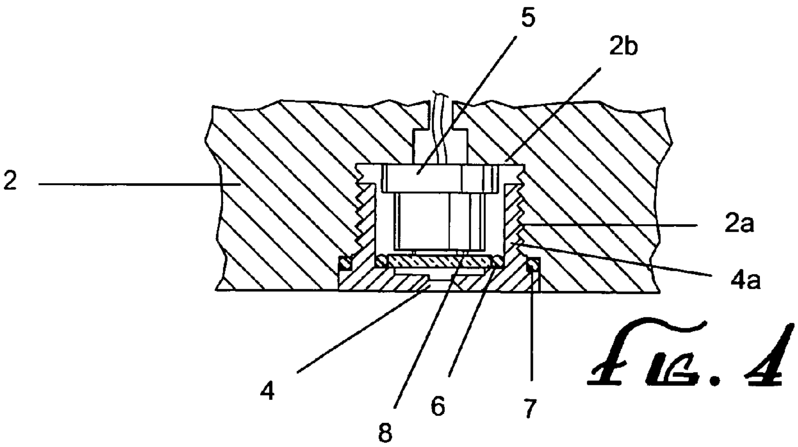
FIG. 4

CONCEALED CAMERA

FIELD OF INVENTION

The present invention is directed to the use of a camera for safety, surveillance or a host of different uses. More specifically, the present invention is directed to the use of a concealed camera whereby it is mounted in an housing which would typically be mistaken for a common functional device. The invention may be used in almost any situation, whether industrial, commercial or residential. In addition, the invention may be used in conjunction with a building, vehicle or any other setting where safety, visibility or security concerns arise.

BACKGROUND OF THE INVENTION

For safety and security reasons, these is a need for a versatile camera system which may be used for surveillance without detection. In a commercial or residential setting, these applications are both numerous and obvious. In an outside location, such as a loading dock, such a system is needed for security and safety of the personnel, vehicles and the goods involved. Additionally, in a motor vehicle, especially a heavy vehicle such as a tractor trailer or a garbage truck, concerns include vandalism, traffic safety and overcoming obscured or blind spots during normal operation and backing up the vehicle.

Drivers of highway trucks, garbage trucks and other large vehicles often have a very small field of vision as to traffic or obstacles behind their vehicles. In order to see a wider field, larger mirrors and more outwardly displaced mirrors are commonly found on these large vehicles. These mirrors, due to both their size and location, however, are susceptible to damage, wind resistance, wind noise and other driver distractions. Regardless of the mirror position, there will likely remain some area in the rear of the vehicle which is obscured from view, commonly known as a “blind spot.” In fact, as the vehicle size increases, so does the rear blind spot.

Many commercial and industrial vehicles presently perform complicated and/or multiple tasks. For example, one typical garbage truck design involves a cantilevered powered arm which grasps and lifts a trash container, raising it to dump the contents into the waste bin of the truck. For an application such as this, multiple camera images would be beneficial to the driver. Some of these images might include the rear of the vehicle, the jaws of the cantilevered arm and the opening of the trash hopper of the vehicle. To date, none of the above delineated concerns or needs have been adequately addressed.

For example, the device described in U.S. Pat. No. 5,289,321 to Secor, includes cameras mounted on the sides of the vehicle in order to improve the blind spot view. The cameras contemplated in that invention are bulky objects, which protrude from the sides of the vehicle. As such, these cameras are highly susceptible to damage from inclement weather, scrapes on the side of the vehicle as well as falling road debris. In addition, any bumping of the camera or its mounting will likely disturb the field of vision of the camera, rendering it useless for the proposed task. Finally, these large cameras are clearly noticeable and detectable, making them excellent targets for vandalism, theft or other mistreatment. In addition, such a large system, when used for security purposes, is often counterproductive, as it alerts would be thieves of an important cargo.

Conventional camera systems are also typically visually undesirable. Large systems, as discussed above, are obtrusive and become targets for malcontents and criminals. Moreover, should the subject realize they are under surveillance they may either become uncomfortable and exit the premises or vehicle. Alternatively, if surveillance is perceived, the subject, whether they are an outside individual or even an employee, may take action to end the operation of the device, such as disconnection of power or damage to the camera. Lastly, conventional cameras may distract from the aesthetic appeal of the interior or exterior of the premises or vehicle on which they are mounted.

A concealed camera system was proposed in U.S. Pat. No. 6,151,065 to Steed, whereby a vehicle light serves as a cavity for a concealed camera. That system, however, is highly deficient for the above described needs. In the Steed system, the camera is mounted in a vehicular fixture and the camera views a field through a cover, which is typically a colored transparent surface. That system has numerous inherent shortcomings, such as the need for a vehicular light source, in part due to the colored covering over the lens. This would preclude its use without a light source and in some positions on a vehicle, the light may actually draw unwanted attention to the camera assembly. Similarly, having to view the image through a colored lens will necessarily distort or artificially color the image. Moreover, the colored lens will detract from and may even preclude the reception of a clear image, especially at night or in darkened conditions. Without a colored lens, the camera element would be clearly visible to an outside observer, defeating the stealth or concealed operation of the camera. Also, the Steed system does not describe nor contemplate the use of multiple synchronized cameras for different operations of a vehicle and the desirable automatic synchronization of the multiple cameras, other than a reliance upon the turn signal indicator elements which must be engaged by the operator.

For the foregoing reasons, there is a need for a concealed camera system that requires no artificial light, that has a lens which may be directly exposed to the ambient image and is of a size whereby it may be placed in a variety of undetectable housings or concealment arrangements.

SUMMARY OF THE INVENTION

An object of the present invention is to provide a concealed camera wherein the camera lens may be exposed to the ambient lighting and environmental conditions without any filters, colored lenses or artificial lighting. Another object of the invention is to provide a concealed camera which may be mounted on any outwardly facing surface of an housing such that the image received therefrom may include the precise angle and field as desired by the user.

Yet another object of the present invention is to provide a concealed camera wherein the lens views the image through a pinhole of such small size that the camera is undetectable. Despite the small diameter peep hole, the high resolution of the camera along with its distinctly shaped lens permits a wide angular field of vision, similar to that of a more open view as would be perceived by a conventional camera.

The objects of this invention are accomplished by incorporating a sub miniature camera within an housing having numerous outward appearances, none of which would be perceived by a passer by as a camera or surveillance device. Moreover, in so positioning the device, it is dependent upon only the ambient light and environmental conditions and in everyday surroundings, the present invention will provide a clear and sharp image to a recipient screen or other device. Since the subminiature camera itself is the only critical element to be enclosed within the housing, the size and shape of the housing may be greatly reduced and may be fully customized to the needs or particular aesthetic or functional design requirements of the user. In addition, the positioning of the mounted camera, for example on a vehicle, is greatly simplified, as the camera may be mounted on any external surface of the housing and will thereafter span a wide field of vision.

In locating the camera lens to be directly exposed to the ambient lighting and conditions, there is no distortion nor false lighting used by or, in fact, developed by the invention. Even in the darkness of night, no external lighting is required to import a clear and precise image from the camera element.

The objects of the present invention are achieved by fabricating an housing component which may take various shapes and sizes and inserting a camera body into a recess in any one of its outwardly facing surfaces. Since the camera need not be located in a functional lighting device, there is less attention drawn to the device, especially at night. The subminiature camera views the image to be captured through a very small peep hole which is nearly undetectable, even upon close examination. Indeed, when mounted at some distance from the subjects of the image, the camera becomes further concealed due to the tiny size of the peephole and the lack of lighting at, near or produced by the concealed camera.

In its most common embodiment, the concealed camera comprises an housing, at least one miniature video camera with at least one cover plate with a peep hole opening. The housing would then typically have one or more cavities into which a camera of the type which does not require a secondary artificial light source is inserted, whereby the camera and corresponding cavity would be capable of being inset on any face of the housing without regard to the cover plate location.

BRIEF DESCRIPTION OF THE DRAWINGS

The foregoing objects, features, advantages and preferred embodiments of the evacuation unit and method of the present invention will be better understood from the following detailed description taken in conjunction with the accompanying drawings in which:

FIG. 3 is an exploded view of the camera viewing elements of a preferred embodiment of the present invention in the configuration of a vehicular concealed camera whereby the housing is disguised to appear as a reflector element of the vehicle. In this view means of installation of the camera peep hole is visible and thereby shows the one method to achieve same.

FIG. 4 is a sectioned view of a preferred embodiment of the present invention in the configuration of a vehicular concealed camera wherein the camera elements are depicted as being threaded into a radial cavity of the housing.

DETAILED DESCRIPTION OF A PREFERRED EMBODIMENT OF THE INVENTION

The accompanying Figures depict embodiments of the present invention, and features and components thereof. With regard to means for fastening, mounting, attaching or connecting the components of the present invention to form the apparatus as a whole, unless specifically described otherwise, such means are intended to at least encompass conventional fasteners such as machine screws, machine threads, snap rings, hose clamps such as screw clamps and the like, rivets, nuts and bolts, toggles, pins and the like. Components may also be connected by friction fitting, snap fitting, adhesives, or by welding or deformation, if appropriate. Unless specifically otherwise disclosed or taught, materials for making components of the present invention are selected from appropriate materials such as metal, metallic alloys, natural or synthetic fibers, plastics and the like, and appropriate manufacturing or production methods including casting, extruding, molding and machining may be used.

Any references to front and back, right and left, top and bottom, upper and lower, and horizontal and vertical are intended for convenience of description, not to limit the present invention or its components to any one positional or spacial orientation.

Figure 1:
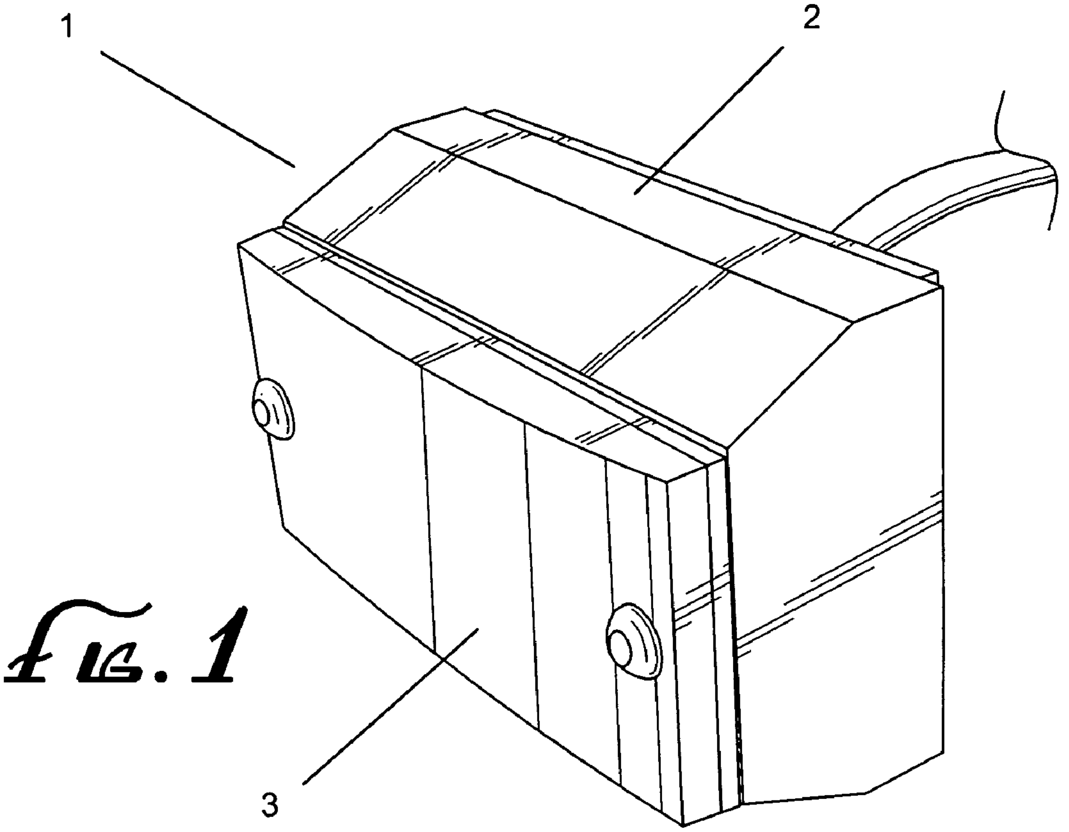
FIG. 1 is a top right perspective view of a preferred embodiment of the present invention in the configuration of a vehicular concealed camera whereby the housing is disguised to appear as a reflector element of the vehicle.
Figure 2:
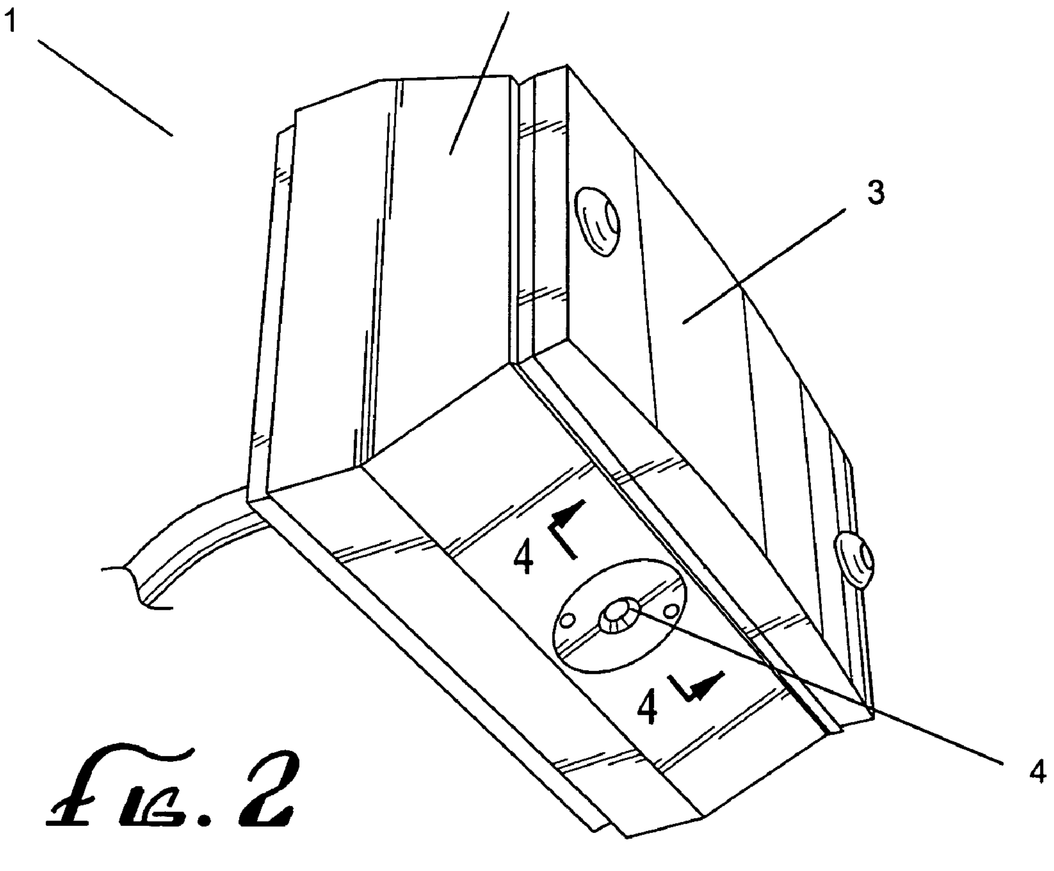
FIG. 2 is a bottom left perspective view of a preferred embodiment of the present invention in the configuration of a vehicular concealed camera whereby the housing is disguised to appear as a reflector element of the vehicle. In this view the installed camera peep hole is visible and thereby shows the diminutive size of same.

Referring to FIGS. 1 and 2, the concealed camera 1 is shown in a preferred embodiment as the configuration of a vehicular reflector body. The invention as shown comprises an housing 2, a cover plate 3 and a camera. In this embodiment, although the device would be used as a common reflector, the camera would not necessarily be mounted in any particular face, and most often, the camera would only be evidenced by the presence of a very tiny peep hole 4. In the scope of the housing, it becomes clear that the peep hole 4 is of such small size that it is barely visible and when the housing is mounted above the rear of a vehicle, the peep hole 4 becomes nearly undetectable.

While in this preferred embodiment, the housing is configured to simulate a reflector body, the housing may be constructed to encompass nearly any size and shape. It may be configured to appear as a functioning device such as a light or signal or it may be a portion of a functional device, such as incorporated into the base of a hinge, door latch, panel or any other small piece typically affixed to a vehicle. In fact, while vehicles are a common use of the concealed camera, it is equally at home in commercial and residential settings, such as door entrance security, building security, correctional and personal surveillance and workplace surveillance. Being of such small peep hole size and requiring no artificial light, the invention works especially well when utilized in clocks, bells, alarm sensors and many other commonly found residential and commercial devices.

The housing may be made of a variety of materials. In a preferred embodiment, it could be fabricated from an aluminum block. Due to the very small size requirements of the camera, however, the housing design and size is well suited for fabrication from a molded or formed plastic or polymer compound. Such construction would easily facilitate the concealed design of the device as well as facilitate low cost and corrosion free assemblies.

Referring now to FIGS. 3 and 4, a preferred embodiment of the present invention is shown in an exploded view and a sectioned view, respectively, to show the simplicity of the concealed camera design. In this embodiment, the cover plate 3 is configured to appear as a reflector. The housing 2 further includes a female radial bore 2_a_ into which the camera 5 is captured. As shown in FIG. 4, in this embodiment, the radial bore 2_a_, while open at its base, further includes a shoulder 2_b_, of a diameter larger than that of the camera 5, thereby preventing the camera 5 from falling through the bore 2_a_ into the housing 2. The back face of the camera 5, when installed, is pressed against the shoulder 2_b_. Similarly, the front face of the camera 5 is held in place in the preferred embodiment by the lens peephole 4, which in this case, includes a male threaded outer diameter 4*a*. As the peep hole 4 is threaded into the housing bore 2*a,* the camera 5 is secured into the bore 2*a,* held in place between the shoulder 2*b* and the peep hole 4. An inner O ring 6 and an outer O ring 7 surround a transparent lens 8 to complete the assembly. This lens 8 functions to further seal the assembly and to provide an extra layer of environmental protection to the camera 5. The O rings 6 and 7, perform a dual purpose in that they seal the camera 5 from the elements and they provide a tight fitting assembly due to the compressibility of the O rings 6 and 7.

The concealed camera may be configured in various embodiments and is contemplated for use with a wide variety of cameras. In the preferred embodiment as shown in the accompanying figures, the camera would typically be a high resolution camera in either color or black and white imagery. In any event, the contemplated camera for use in this invention would be one well known to those skilled in the art and would further be of a type which requires no artificial or secondary lighting to perceive the subject image. The high resolution of the camera is of paramount importance to this invention, as it permits the use of a tiny peephole and the placement of the camera in any desired position in which it may capture the desired field of images. The peephole of the concealed camera is very small, typically less than ⅛ inch in diameter.

The present invention may be embodied in other specific forms without departing from the essential spirit or attributes thereof. It is desired that the embodiments described herein be considered in all respects as illustrative, not restrictive, and that reference be made to the appended claims for determining the scope of the invention.

What is claimed is:

1. A reflector-concealed camera assembly for use on a vehicle, the assembly comprising:

a housing having a plurality of outer surfaces each facing a different direction, one of the plurality of outer surfaces defining a cavity thereon extending into the housing for receiving light therethrough;

a miniature camera disposed within the cavity; and a reflecting plate attached to another of the plurality of outer surfaces, the reflecting plate being configured to transmit light when illuminated by external light.

2. The assembly of claim 1, wherein the camera is selected from the group consisting of black and white, color, still image, motion, motion detection, and closed circuit types.

3. The assembly of claim 1, further comprising at least one electrical lead extending from the camera for connecting to other components to create a video surveillance system.

4. The assembly of claim 1, wherein the camera is retained within the cavity selected from the group of retaining means consisting of coaxial threads, adhesive, retention pin, set screw and an interference fit between the outer diameter of the camera and the inside diameter of the cavity.

5. The assembly of claim 1, wherein the housing is generally shaped as a box having six generally flat outer surfaces.

6. The assembly of claim 1, wherein the opening of the cavity is positioned on the outer surface relative to the reflecting plate such that it is undetectable to an observer when the face of the reflecting plate is visible.

7. The assembly of claim 1, wherein the at least one cavity is shaped as a substantially straight cylinder.

8. The assembly of claim 7, further comprising a cavity covering removably sealing each cavity, wherein the cavity covering defines a peep hole thereon having a substantially smaller diameter than the cavity for transmitting light therethrough.

9. A light device-concealed camera assembly for use on a vehicle comprising:

a housing having a plurality of outer surfaces each facing a different direction, one of the plurality of outer surfaces defining a cavity thereon extending into the housing for receiving light therethrough;

a miniature camera disposed within the cavity;

an electronic light source attached to and configured to emit light from another of the outer surfaces; and a light transmitting cover plate disposed upon the same outer surface as the light source for protection thereof.

10. The assembly of claim 9, wherein the camera is selected from the group consisting of black and white, color, still image, motion, motion detection, and closed circuit types.

11. The assembly of claim 9, wherein the camera is retained within the cavity selected from the group of retaining means consisting of coaxial threads, adhesive, retention pin, set screw and an interference fit between the outer diameter of the camera and the inside diameter of the cavity.

12. The assembly of claim 9, further comprising at least one electrical lead extending from the camera for connecting to other components to create a video surveillance system.

13. The assembly of claim 9, wherein the opening of the cavity is positioned on the outer surface relative to the reflecting plate such that it is undetectable to an observer when the face of the reflecting plate is visible.

14. The assembly of claim 9, wherein the cavity is shaped as a substantially straight cylinder.

15. The assembly of claim 14, further comprising a cavity covering removably sealing each cavity, wherein the cavity covering defines a peep hole thereon having a substantially smaller diameter than the corresponding cavity for transmitting light therethrough.

* * * * *